United States Patent [19]

McRae et al.

[11] Patent Number: 4,639,937
[45] Date of Patent: Jan. 27, 1987

[54] HF AVALANCHE RELAY COMMUNICATION TECHNIQUE

[75] Inventors: Daniel D. McRae, West Melbourne; Joseph B. Cain, III, Indialantic, both of Fla.

[73] Assignee: Harris Corporation, Melbourne, Fla.

[21] Appl. No.: 559,091

[22] Filed: Dec. 7, 1983

[51] Int. Cl.$^4$ .............................................. H04B 7/15
[52] U.S. Cl. .................................. 375/40; 455/18; 455/51; 375/100; 375/3
[58] Field of Search .................. 455/18, 51; 370/60, 370/94, 97, 103; 375/107, 3, 38, 40, 100; 340/825.5

[56] References Cited

U.S. PATENT DOCUMENTS

| | | | |
|---|---|---|---|
| 3,858,007 | 12/1974 | Ganssmantel | 375/107 |
| 4,012,593 | 3/1977 | Yamaguchi | 178/71 R |
| 4,255,814 | 3/1981 | Osborn | 455/51 |
| 4,365,338 | 12/1982 | McRae et al. | 375/12 |
| 4,475,246 | 10/1984 | Batlivala et al. | 455/24 |

OTHER PUBLICATIONS

*Computer Networks*, Andrew Tanenbaum, Prentice-Hall, Inc., 1981, pp. 112, 129, 164, 198, 261, 280.

*Primary Examiner*—Benedict V. Safourek
*Assistant Examiner*—Raymond C. Glenny
*Attorney, Agent, or Firm*—Antonelli, Terry and Wands

[57] ABSTRACT

An "avalanche" relay communication network is configured of a plurality of transceiver stations spread out over a geographic area of interest to establish multipath communication diversity among the stations. The transceiver equipment at each station has the capability of simultaneous transmission over the same frequency through a "common knowledge" network timing scheme such as TDMA and has the capability of taking advantage of received multipath signals. Communications between an originating station and an intended recipient station are achieved by the originating station modulating onto an HF carrier a digital packet formatted to contain the number of times the message is to be repeated and a means of establishing the quality of the received message. All stations which have correctly received the packet repeat that same message on the same carrier frequency at the same preestablished future absolute time (or times, based on the number of repeats).

15 Claims, 4 Drawing Figures

FIG. 1.
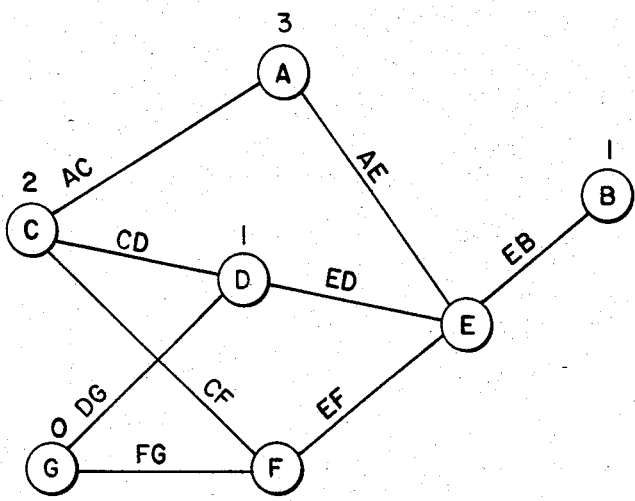
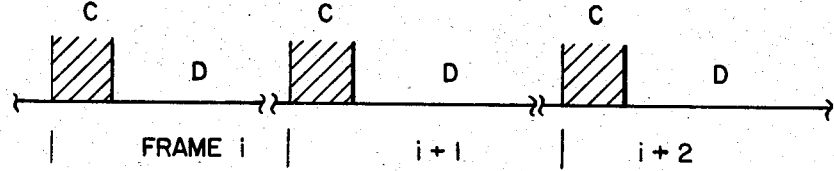
FIG. 3.

HF AVALANCHE RELAY COMMUNICATION TECHNIQUE

FIELD OF THE INVENTION

The present invention relates in general to communication systems and is particularly directed to a scheme for optimizing the connectivity of an HF network by employing a multiplicity of simultaneously engaged relay stations communicating over the same frequency.

BACKGROUND OF THE INVENTION

One of the most challenging tasks presently facing the communications industry is providing reliable data and voice transmission over an HF ionospheric channel. The characteristics of the channel itself, which vary with both time and external conditions that affect the ionospheric propagation medium, as well as the presence of both natural and man-made interference, have made the HF channel relatively unreliable for analog voice communications. In addition, the multipath and rapid phase variations of such a channel make its use for reliable digital communications particularly difficult.

A number of proposals for improving HF communication reliability have involved the proper selection of frequencies which provide favorable propagation conditions for a particular transmission. Still, even though such "frequency management" approaches offer improvement, they usually achieve increased reliability by occupying additional spectral space, a commodity that is already very precious within the limited HF band. Other proposals that have sought to avoid the bandwidth crowding problem of frequency allocation have employed time-path diversity. The drawback with the latter approach has been the need for instantaneous status relative to the connectivity of the network.

SUMMARY OF THE INVENTION

In accordance with the present invention the reliability of the connectivity of an HF communication channel is substantially improved, as compared with the above-referenced proposals, by a communication scheme that uses relay techniques to achieve path diversity without the need for additional frequency allocation or the requirement of instantaneous status information. To achieve this objective the relay scheme of the present invention essentially has only two fundamental requirements—the availability of network timing and the use of digital modems that have the capability of reception over multiple receive paths. Both of these requirements are readily incorporated in what is termed an "avalanche" relay communication network.

Pursuant to the present invention this network is configured of a plurality of transceiver stations spread out over a geographic area of interest to establish multipath communication diversity among the stations. The transceiver equipment at each station of the network enjoys the capability of simultaneous transmission over the same frequency through a "common knowledge" network timing scheme such as TDMA (time division multiple access) commonly employed in present day communication-relay systems, (e.g. satellite transmission networks). With the use of a TDMA timing scheme, digital signalling transmission is accomplished through packet switching. The modem employed in each transceiver may be the type described in U.S. Pat. No. 4,365,338 issued Dec. 21, 1982 to Daniel D. McRae et al, entitled "Technique for High Rate Digital Transmission Over a Dynamic Dispersive Channel" and assigned to the Assignee of the present application. Essentially, that type of modem has the capability of taking advantage of all received multipath signals with an arrival time spread plus the status time inaccuracy plus the propagation time uncertainty associated with receiving from unknown stations in the network.

Within the above network, communications between an originating station and an intended recipient station are achieved by an "avalanche" relay scheme initiated by the originating station. In accordance with this "avalanche" scheme, the originating station initiates a message transmission by modulating onto an HF carrier, during a preassigned TDMA time slot, a digital packet formatted to contain, inter alia, a control segment specifying the number of times the message is to be repeated and a means of establishing the quality of the received message (e.g. CRC or parity bits). All stations which have correctly received the packet (based upon the established quality criteria) repeat that same received message (except for a modification of the control segment) at the same preestablished future absolute time on the same carrier frequency. The modification of the control segment is to reduce the number of times that the message is to be repeated, and essentially involves decrementing the repeat number by one. (Thus, when a station receives a message with a repeat number equal to zero it does not repeat the message.) The number of repeats prescribed by the originating station's initial transmission may be selected for a particular network of interest, on the basis of the number of multipaths available and the number of anticipated multiple transmission (among the various stations) per simultaneous message repeat, so that connectivity availability essentially ensures that the intended recipient will, at some time during the avalanche sequence (from initial transmission to last repeat), receive the message.

BRIEF DESCRIPTION OF THE DRAWINGS

FIG. 1 is a layout illustration of the distribution of a plurality of stations making up an avalanche-relay communication network;

FIG. 3 is an exemplary timing format diagram showing the arrangement of a control slot and data frame for TDMA formatted avalanche signalling.

DETAILED DESCRIPTION

Figure 2:
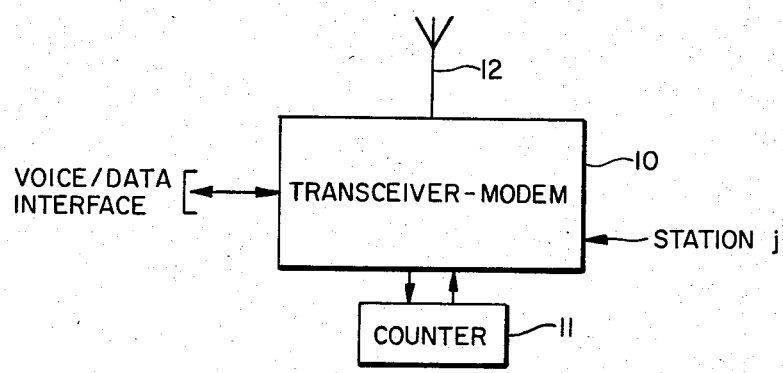
FIG. 2 shows a block diagram of an avalanche-relay network station.

Referring now to FIG. 1, an exemplary distributed layout for an avalanche-relay communication network is shown as comprising six stations A-F distributed over a prescribed geographical area. The make-up of an individual station may be represented by the simplified block diagram of FIG. 2 and essentially comprises a transceiver-modem 10 coupled to an HF antenna 12 and a voice/data I/O interface. Also associated with the transceiver modem is a counter 11, which is shown as a separate element simply for the purposes for the explanation to follow. It should be understood at this point that the make-up of the transceiver modem may be selected from any number of communication equipments that provide the capability of taking advantage of all received multipath signals having an arrival time spread which is equal to the channel multipath spread, plus the station absolute timing accuracy, plus the propagation time uncertainty associated with receiving from unknown stations in the network. As mentioned briefly above, one type of HF modem which satisfies this criterion is that embodied in the communication scheme described in U.S. Pat. No. 4,365,338 issued Dec. 21, 1982 to Daniel D. McRae et al entitled "Technique for High Rate Digital Transmission Over a Dynamic Dispersive Channel", assigned to the Assignee of the present application. This type of modem is especially designed to solve the problem of multipath, intersymbol interference and phase transitions which have been a substantial source of degradation in HF communication schemes. With recent advances in sophisticated HF modems, it is now possible to successfully address these problems and to provide voice and data signalling successfully over an HF ionospheric channel. Since an understanding of the details of the transceiver-modem 10 are unnecessary for an understanding of the present invention, no further description will be provided here. Instead, reference may be made to the above reference patent or other current literature in which sophisticated HF modems having the above capability are described.

In addition to the need for a modem with the above capability, the present invention also requires that the network stations A-F of the network shown in FIG. 1 know absolute time (within a few milliseconds) and that the digital traffic being transmitted over the network be packetized, with each data packet consisting of a specified number of bits with a prescribed format. Advantageously, timing for the network and access to the network among the various stations for message transmission uses a time division multiple access (TDMA) scheme, such as those commonly employed in satellite communications, through which each station of the network is assigned a prescribed time slot within which to have communication access to the network for transmission and the data format is time division multiplexed, having a format such as that illustrated in FIG. 3.

With reference to FIG. 3, one exemplary TDMA frame format is illustrated. Each frame is shown as consisting of a control slot of a prescribed time length or number of data bits, followed by a data slot. For providing robustness against jamming, it is often the case that the control slot and subdivisions of the data slot are randomly interspersed among one another through a suitable spreading or set of spreading sequences.

In the signalling format shown in FIG. 3, each control slot is illustrated as occurring at the beginning portion of a frame, since it is within this control slot that important information, especially the repeat control information, pursuant to which the relay avalanche technique is carried out is provided. Thus, in accordance with the preferred iteration of the TDMA format, the control slots occupy the beginning of a message frame.

As is common practice in the art, control slots include a variety of information such as transmission requests, priority, access granting, etc. and, pursuant to the present invention, a message repeat number. It should be noted that the message format to be used in accordance with the principles of the present invention is not limited to that shown in FIG. 3. The TDMA format illustrated in the Figure is simply for purpose of providing an exemplary illustration of a preferred embodiment. Moreover, in terms of an understanding of the present invention, what is important is that there be an established timing synchronization among all the stations on the network and the use of some portion of a message packet to identify the number of repeats for the transmission. Thus, in conjunction with the use of an HF modem and communication signalling scheme as described in the above referenced patent each frame-i of FIG. 3 corresponds to an information frame between which PN sequences are inserted. Also, the frame includes reception quality bits, such as parity or a cylic redundancy check sequence appended to a sequence of data bits that the receiver user in the customary manner to establish signal quality (i.e. a message has been correctly received). In the transceiver-modem an acceptable received message is buffered for preparation for subsequent retransmission at a preestablished time slot in accordance with the synchronized timing signals of the TDMA clock shared by the stations of the network.

In order to gain a full appreciation of the invention, reference is again directed to FIG. 1 wherein an originating station A is desirous of communicating with the intended recipient station B. Of course, also included within the network are a number of additional stations C-F capable of communicating with one another and with stations A and B.

With originating station A being desirous of communicating with station B and having gained access to the communication channel via its assigned TDMA time slot, a digital packet is assembled at station A, which packet contains a number (in the present example the number 3) indicating the number of times the message is to be repeated. Also, as mentioned above in the digital packet there is included some means of establishing the quality of reception at a receiving station, such as parity or cyclic redundancy check (CRC) bits which form part of the message packet. In the example shown, the reference numerals above each of the stations indicate the number of times that those particular stations will be instructed to (re)transmit the received message. For its initial attempt, station A has placed in a counter 11 associated with its modem 10 (see FIG. 2) the number three which will be included as part of the control slot in the message packet. The number 3 indicates that station A will transmit the message a total of three times, once initially, followed by two repeats. Each time the message is transmitted, the contents of counter 11 are decremented by one. In the course of assembling a message for transmission, transceiver modem 10 reads the contents of counter 11 and continues to transmit the message during a preestablished time slot as governed by the TDMA time slot assignment structure until the contents of counter 11 have been decremented to zero.

For purposes of the present description, let it be assumed that station A succeeds in conveying the message only to stations C and E during the time of the original transmission. These successful transmissions are illustrated in FIG. 1 as corresponding to communication channels AC and channels AE, the first letter indicating the originating station and the second letter indicating the terminating station for the channel.

For the original message transmission, each of stations C and E receives the data packet, decodes the control slot and processor any data that may be addressed to it. In the present example, it is assumed that the address of the intended recipient is station B so that neither station C nor station E processed any data but simply buffers the message for retransmission. However, control information is processed, specifically the number of times of repeat transmission. During the transmission of the initial message from station A, the counter at station A was set at three and decremented upon the first transmission. This means that station A will transmit the message three times, one originating transmission, followed by two repeats. The control information that is assembled in the message packet to be transmitted to other stations in the network causes a lesser number of repeats (by stations C and E) so that the control slots of the retransmitted message packets will contain the number two as an indicator of the number of repeats for the stations receiving the initial transmission. Thus, each of stations C and E (the only stations that received the message on the initial transmission from station A) will repeat the message (along with station A) during the next two subsequent time slots, corresponding to time slots $i+1$ and $i+2$ shown in FIG. 3.

When a station receives a message and reads the contents of the control slot indicating the number of repeats, it loads its counter (counter 11 as shown in FIG. 2) with that number and decrements the counter on a subsequent transmission.

On the next transmission, namely the first repeat or second transmission of the message from each of stations A, C and E, it will be assumed that the transmission from station C reaches stations D and F over communication channels CD and CF and the transmission from station E reaches stations D, F and B over communications channels ED, EF and EB, respectively. Thus, on the first repeat or second transmission, the original message from station A that has been repeated from stations A, C and E has reached every station except for station G. With station B being the intended recipient station, it has received the communication on the second repeat.

In the transceiver-modem equipments at stations A, C and E, counters 11 will have been decremented at this point to the number one. The number one will also have been inserted into the counters at stations D, F and B so that, during the next or third time slot, each station in the network, except for station G, will repeat the message. Station G is shown in FIG. 1 as receiving the message on third try (with a repeat count of zero), so that is will not repeat the message at all, since its counter will be loaded with the number zero, indicating no transmission.

In the foregoing example, it has been assumed that the connectivity of paths among stations does not change in the time between repeats. This is a worst case assumption, but is approximately true for many networks if the packets are short and the specified repeat times sequential.

As will be appreciated from the foregoing description of the avalanche-relay communication technique in accordance with the present invention, all stations within the network receive the message correctly even though individual link connectivity is extremely poor. Since all stations receive the message, the destination of any particular station or stations for whom the message is intended may be included in a header in the digital packet.

As contrasted with conventional frequency diversity or continuous status availability schemes, the present invention offers a number of advantages. First of all, if any relay path or paths from the originating station to the intended recipient or recipients exist at any instant of transmission, the recipient will receive the message. Moreover, if the transceiver-modem is capable of taking advantage of the extra power from the multiple stations that are transmitting, such as the modems at stations D, F and G which receive the repeated message over a plurality of paths, there will be cases where the avalanche technique will succeed when the best possible relay with the same number of repeats will not succeed.

Furthermore, the achieved connectivity will be the best available for whatever network status exists, even though the originating station was not aware of that status. Thus, if one or more of the stations become inoperative, the message would be relayed automatically by whatever paths remain.

The avalanche communication technique according to the present invention is particularly powerful when broadcast messages are required which would normally demand connectivity between the originating station and all other stations in the network. Furthermore, for ground wave networks such as might be employed in military tactical HF networks, the avalanche scheme according to the present invention represents a method of extending conductivity beyond that normally available.

Finally, the avalanche approach of the present invention may not normally include radio silent stations in a network as automatic repeaters. However, the increase in reliability versus required transmission power coupled with the fact that multiple locations are normally transmitting during repeat times would make the location of individual repeater stations difficult.

As an illustration of some numerical examples of connectivity of networks using the avalanche scheme according to the present invention, tabulated below is a comparison to the connectivity of using only a single transmission and the connectivity if the same number repeats is used without avalanche, as compared to using it with avalanche. In all cases, the total number of transmission is equal to three and, for purposes of simplification, the probability of correct transmission of a packet is the same for all links in the network. In the tabulated comparison below, two link conditions are analyzed. In the first case, each transmission on a link is totally dependent upon the outcome of the previous transmission on that link. Thus, if the initial transmission from the sender to the recipient fails, the next two transmission will also fail. The second condition is for the case of total independence between transmissions at different times on the same link. In reality, transmission conditions will fall somewhere between these two analyzed cases.

TABLE 1

| | Time Dependent - Point to Point Transmissions | | | | |
|---|---|---|---|---|---|
| Link Miss Prob. | Three Proposal Miss Prob. | 10-Station Avalanche Miss Prob. | 20-Station Avalanche Miss Prob. | dB Gain 10-Stations | dB Gain 20-Stations |
| .1 | .1 | $7.98 \times 10^{-8}$ | $1.91 \times 10^{-15}$ | 61.2 dB | 103.2 dB |
| .2 | .2 | $1.40 \times 10^{-5}$ | $8.94 \times 10^{-11}$ | 42.0 dB | 93.9 dB |
| .3 | .3 | $2.09 \times 10^{-4}$ | $2.35 \times 10^{-8}$ | 32.3 dB | 71.8 dB |
| .4 | .4 | $1.30 \times 10^{-3}$ | $9.29 \times 10^{-7}$ | 25.9 dB | 57.3 dB |
| .5 | .5 | $6.33 \times 10^{-3}$ | $1.60 \times 10^{-4}$ | 20.4 dB | 46.4 dB |
| .6 | .6 | $3.20 \times 10^{-2}$ | $2.16 \times 10^{-4}$ | 14.5 dB | 36.3 dB |
| .7 | .7 | .141 | $4.55 \times 10^{-3}$ | 9.0 dB | 24.2 dB |
| .8 | .8 | .421 | $9.21 \times 10^{-2}$ | 4.7 dB | 12.1 dB |
| .9 | .9 | .791 | .587 | 1.7 dB | 4.1 dB |

Table 1 set forth above, shows the results of connectivity between a single originating station and a single recipient station. In all cases, the probabilities shown are the probability of not getting the correct packet to the intended recipient. Column 1 of Table 1 shows the assumed probability of incorrect transmission on an individual link. Columns 2, 3 and 4 show the probability of failure assuming three transmissions (an initial transmission followed by two repeats), without avalanche, with avalanche in a ten station network and with avalanche in a twenty station network. The data set forth assumes total dependence among paths.

the signal-to-noise ratio to support the specified link reliability illustrated in Table 1. Columns 5 and 6 of the table show the reduction in required signal-to-noise ratio in dB as a result of avalanche for the message failure probabilities with avalanche than with the same number of repeats without it. As can be seen from Table 1, a significant advantage in power consumption is afforded. Specifically, a network using a 400 watt transmitter achieving this reliability without using the avalanche scheme of the present invention could be converted to only a 4 watt network is avalanche is employed.

TABLE 2

| | | Time Independent - Point to Point Transmissions | | | |
|---|---|---|---|---|---|
| Link Miss Prob | Three Repeat Miss Prob | 10-Stations Avalanche Miss Prob. | 20-Stations Avalanche Miss Prob. | dB Gain 10-Stations | dB Gain 20-Stations |
| .1 | $1.00 \times 10^{-3}$ | 0 | 0 | — | — |
| .2 | $8.00 \times 10^{-3}$ | $5.78 \times 10^{-12}$ | 0 | 92.0 dB | — |
| .3 | $2.70 \times 10^{-2}$ | $8.28 \times 10^{-9}$ | 0 | 65.2 dB | — |
| .4 | $6.40 \times 10^{-2}$ | $1.34 \times 10^{-6}$ | $1.43 \times 10^{-12}$ | 47.7 dB | 101.2 dB |
| .5 | .125 | $7.10 \times 10^{-5}$ | $2.82 \times 10^{-9}$ | 32.7 dB | 76.8 dB |
| .6 | .216 | $1.81 \times 10^{-3}$ | $1.34 \times 10^{-6}$ | 21.3 dB | 52.6 dB |
| .7 | .343 | $2.38 \times 10^{-2}$ | $2.89 \times 10^{-4}$ | 12.4 dB | 31.6 dB |
| .8 | .512 | .160 | $2.16 \times 10^{-2}$ | 6.1 dB | 15.2 dB |
| .9 | .729 | .554 | .350 | 2.1 dB | 4.7 dB |

For purposes of simplification, it is assumed that the transceiver-modem requires some prescribed signal-to-noise power ratiol p, in order to correctly receive the message (i.e. any greater power results in a correct reception, any less power results in an incorrect reception). Furthermore, it is assumed that the channel of interest is Rayleigh fading, resulting in an exponential distribution of power signal-to-noise ratio, i.e.:

$$f(p) = \frac{1}{p_a} e^{-p/p_a}$$

where: $p_a$ equals the average received power signal-to-noise ratio. These assumptions permit the calculation of Table 2 above, provides the same point-to-point information above but for a situation where the time transmissions are independent. It will be observed that even under this condition, the avalanche communication technique according to the present invention provides a 21.3dB improvement over a three repeat system when 99.8% reliability is required. This is a 28.2dB gain over a single transmission.

TABLE 3

| | | Time Dependent - Broadcast Transmissions | | | |
|---|---|---|---|---|---|
| Link Miss Prob | 10-Station 3-Repeat Miss Prob. | 20-Station 3-Repeat Miss Prob. | 10-Station Avalanche Miss Prob. | 20-Station Avalanche Miss Prob. | dB Gain 10 Stations | dB Gain 20-Stations |
| .1 | .612 | .865 | $9.88 \times 10^{-7}$ | 0 | 54.2 dB | — |
| .2 | .866 | .986 | $2.04 \times 10^{-4}$ | $1.45 \times 10^{-8}$ | 37.1 dB | 83.3 dB |
| .3 | .960 | .998 | $2.97 \times 10^{-3}$ | $1.04 \times 10^{-6}$ | 28.6 dB | 67.3 dB |
| .4 | .990 | 1.0 | $1.48 \times 10^{-2}$ | $3.14 \times 10^{-5}$ | 23.6 dB | 54.3 dB |
| .5 | .998 | 1.0 | $9.92 \times 10^{-2}$ | $3.79 \times 10^{-4}$ | 20.1 dB | 45.0 dB |
| .6 | 1.0 | 1.0 | .176 | $3.39 \times 10^{-3}$ | 15.6 dB | 36.8 dB |
| .7 | 1.0 | 1.0 | .530 | $6.71 \times 10^{-2}$ | 10.1 dB | 24.9 dB |
| .8 | 1.0 | 1.0 | .907 | .640 | 7.5 | — |
| .9 | 1.0 | 1.0 | .999 | .998 | 4.7 dB | — |

TABLE 4

| | | Time Independent - Broadcast Transmissions | | | |
|---|---|---|---|---|---|
| Link Miss Prob. | 10-Station 3-Repeat Miss Prob. | 20-Station 3-Repeat Miss Prob. | 10 Stations Avalanche Miss Prob. | 20 Stations Avalanche Miss Prob. | DB Gain 10 Stations | DB Gain 20-Stations |
| .1 | .230 | .647 | 0 | 0 | — | — |
| .2 | .649 | .957 | 0 | 0 | — | — |
| .3 | .884 | .996 | $6.99 \times 10^{-8}$ | 0 | 74.8 dB | — |
| .4 | .970 | 1.0 | $1.05 \times 10^{-5}$ | 0 | 55.2 ∞ | — |
| .5 | .994 | 1.0 | $5.37 \times 10^{-4}$ | $4.96 \times 10^{-8}$ | 39.8 dB | 83.8 dB |
| .6 | .999 | 1.0 | $1.39 \times 10^{-2}$ | $2.56 \times 10^{-5}$ | 27.0 dB | 58.0 dB |
| .7 | 1.0 | 1.0 | .157 | $6.52 \times 10^{-3}$ | 17.5 dB | 35.2 dB |
| .8 | 1.0 | 1.0 | .646 | .282 | 11.0 dB | — |
| .9 | 1.0 | 1.0 | .987 | .983 | 6.6 dB | — |

Tables 3 and 4 above, provide the same data corresponding to Tables 1 and 2 above, except for the case where a broadcast is made to all of the stations in the network, as opposed to point-to-point transmission. The probabilities shown are those for not correctly reaching all stations, as opposed to not getting the message to a particularly identified intended recipient. As can be seen from Tables 3 and 4, in this situation, the gains afford from the avalanche technique according to the present invention are even more substantial than those associated with a single recipient. The probability of failure through avalanche is increased by a approximately an order of magnitude over that for reaching a single station. Without avalanche, the probability of failure approaches one.

As will be appreciated from the foregoing description and illustrative contrasts between the avalanche scheme according to the present invention and communication techniques not employing the multiple transmission relay scheme embodied in the avalanche approach of the present invention, significant improvement over conventional schemes is provided. It should also be noted that the avalanche communication technique according to the present invention may be employed in conjunction with most frequency management and/or frequency-hoped techniques and can provide substantial additional performance gains over those available from the frequency management approach alone.

In the foregoing description, the exemplary embodiment employed is one having a plurality of relay stations distributed over a prescribed geographical area. By virtue of the fact that each relay station contains a modem that is capable of taking advantage of multipath signals, the probability of success of completing a transmission from an originating station to an attended recipient station is optimized. The avalanche scheme described in conjunction with the embodiment illustrated in FIG. 1 involves the controlled repetition of the same message at prescribed simultaneous transmission times for all stations in the network receiving the message in order to substantially guarantee the probability of success of message throughput from originator to intended recipient. A scheme somewhat similar to that employed in the embodiment of FIG. 1, but not involving an interated sequence of simultaneous transmissions of the same message from a plurality of stations making up the network, may be employed for optimizing or essentially guaranteeing communications between a ground station and a remote earth station via a satellite link. This scheme is particularly attractive for mobile military operations where the failure (e.g. elimination) of a single mobile station will not prevent completion of the transmission from an originating site to a remote station.

Figure 4:
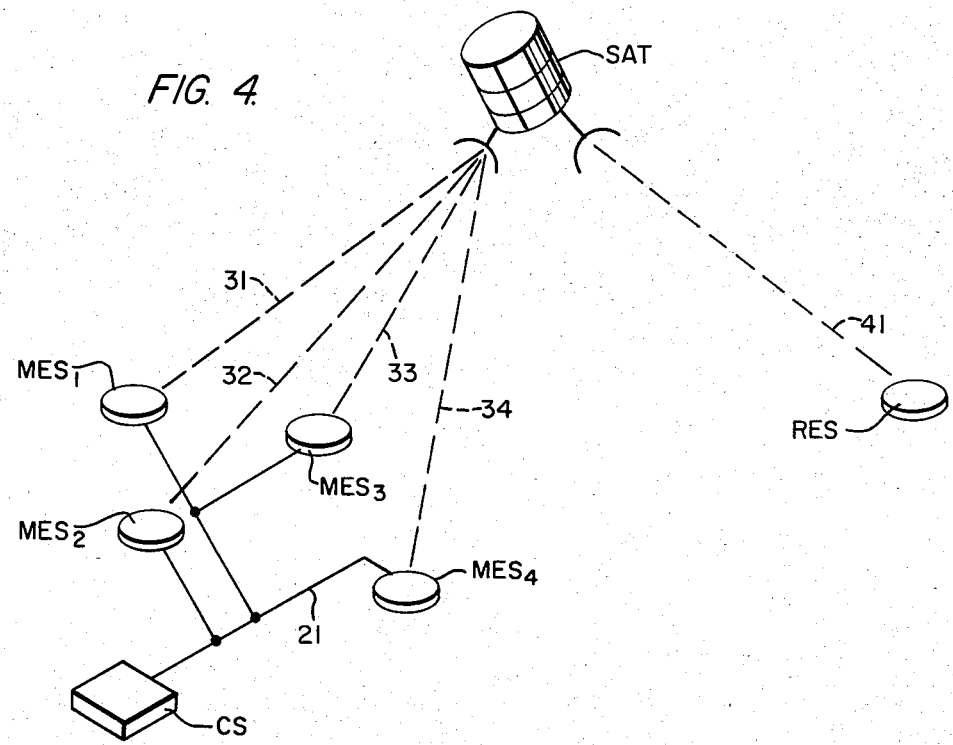
FIG. 4 is a pictorial layout illustration of the distribution of a plurality of mobile ground stations communicating with a remote earth station via a satellite relay link.

FIG. 4 illustrates a multiple mobile transmitter layout comprised of a plurality of mobile (e.g. truck-mounted) earth stations MES$_1$ . . . MES$_4$, each of which is coupled to a command station CS via a dedicated control link 21. With mobile earth stations MES$_1$ . . . MES$_4$ being dispursed over a prescribed (e.g. battlefield) terrain, and being equipped to communicate with a remote earth station RES via respective satellite links 31-34 which are relayed onto earth station RES from satellite SAT over down link 41, it can be seen that was is effectively received by the earth station RES is the equivalent of a multipath signal from the mobile earth stations over a multipath links 31-41, 32-41, 33-41 and 34-41. The use of a plurality of mobile earth stations MES$_i$ is required to essentially guarantee that the command station CS is assured a communication link to earth station RES via satellite SAT in the invent of a (catostrphic) failure or elimination of one or more (not all) of the mobile earth stations MES$_i$.

In accordance with the present embodiment, the avalanching of the communications from the command stations CS to the remote earth station RES is achieved by the simultaneous transmission of the same message from the plurality of mobile stations MES$_i$ under the control of the dedicated link 21. Because remote earth station RES is equipped with a modem that has the capability of taking advantage of all received multipath signals, such as that described in the above mentioned patent, then messages originating at command station CS are essentially guaranteed to be received by remote earth station RES, again assuming integrity of the satellite link for any of the mobile earth stations.

In the present embodiment, successive iterations or repetitions of the same messages over a network are not carried out, as the configuration of the network is different than that in the embodiment shown in FIG. 1. However, there is an avalanching of the message by effecting a plurality of simultaneous transmissions of the same message on the same frequency from a plurality of spaced apart transmitter sources which effectively creates a multipath communication situation. Thus, like the embodiment described in connection with FIG. 1, the avalanche scheme of the communication configuration employing mobile earth stations in a satellite link in the embodiment of FIG. 4 takes advantage of multipath, as contrasted to dealing with multipath as a problem as in the prior art.

Again, as in the case with the embodiment of FIG. 1, each of mobile earth stations MES$_i$ transmits on the same frequency so that band allocation does not become a problem. Moreover, with each of the earth stations being coupled to the command station CS via a dedicated link 21, the need for substantial housekeeping chores relating to status of the various earth stations is unnecessary. Thus, like the embodiment of FIG. 1, the distributed configuration of FIG. 4 also enjoys the ability to optimize connectivity between an originating message source and an intended recipient. As long as anyone station that is coupled to the link (here the satellite link) successful transmission is assured.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. For use in a communication network having a plurality of stations between which communications are to take place, a method of conveying a message from a message originating station to one or more of a plurality of recipient stations of said network for whom the message is intended comprising the steps of:
   (a) transmitting a message from said originating station; and
   (b) at said originating station and at all stations in said network that have received said message, each of said stations being capable of simultaneously receiving at the same receiver thereat signals that have been transmitted from multiple sites and utilizing each received signal to obtain information contained therein representative of said originally transmitted message so as to derive the originally transmitted message regardless of the amplitude, phase and time of arrival of each of the received signals, simultaneously retransmitting said message on the same carrier frequency.

2. A method according to claim 1, wherein each transmission of said message contains information specifying the number of times that the message is to be retransmitted by a station receiving the message.

3. A method according to claim 2, wherein each retransmission of said message by any station in said network is carried out simultaneously with a retransmission by any other station in said network retransmitting said message.

4. A method according to claim 2, wherein each transmission of said message further contains information relating to the quality of the reception of the message and step (b) includes the step of simultaneously retransmitting the message on said same carrier frequency at all stations in said network that have received the message having a satisfactory quality in response to said quality relating information contained in the message.

5. A method according to claim 1, wherein said message is in the form of a digital signal packet modulated onto said same carrier frequency, said digital signal packet containing information specifying the number of times that the message is to be retransmitted by a station receiving the message.

6. A method according to claim 1, wherein step (a) includes transmitting, as part of said message, information specifying the number of times said message is to be retransmitted by a station receiving the message.

7. A method according to claim 6, wherein step (b) includes transmitting, as part of the message retransmitted by stations that have received the message and retransmitted by said originating station, information specifying the number of times that the message is to be retransmitted by stations receiving said retransmitted message.

8. A method according to claim 1, wherein the communication medium over which messages are conveyed among said stations includes an ionospheric channel and said carrier frequency lies in the high frequency portion of the electromagnetic spectrum.

9. For use in a communication network having a plurality of spread apart transmitter stations coupled to a message-originating control station for transmitting messages to a receiving station over a multiplicity of communication paths, a method of conveying a message from said control station to said receiving station comprising the steps of:

(a) coupling said message from said control station to said plurality of spaced apart transmitter stations;

(b) causing said transmitter stations to simultaneously transmit signals containing said message over said multiplicity of communication paths at said same frequency; and (c) at said receiving station, said receiving station being capable of simultaneously receiving at the same receiver thereat signals that have been transmitted over said multiplicity of communication paths and utilizing each received signal to obtain information contained therein representative of said originally transmitted message so as to derive the originally transmitted message regardless of the amplitude, phase and time of arrival of each of the received signals, receiving said signals, containing said message, that have been transmitted over said multiplicity of communication paths at said same frequency and deriving therefrom said message.

10. A method according to claim 9, wherein said spaced apart transmitter stations comprise a plurality of mobile land stations coupled to said control station via a dedicated link and wherein said multiplicity of communication paths include a satellite relay link coupled to a remote receiving station.

11. For use in a communication network having a plurality of stations between which communications are to take place, a transceiver to be employed at a respective one of said stations for retransmitted messages received thereat comprising:

first means, containing receiver means capable of simultaneously receiving signals that have been transmitted over a prescribed carrier frequency from multiple sites and utilizing each received signal to obtain information contained therein representative of said originally transmitted message so as to derive an originally transmitted message regardless of the amplitude, phase and time of arrival of each of the received signals, for receiving a message transmitted over said prescribed carrier frequency from one or more of the stations of the network; and second means, coupled to said first means, for retransmitting said message over said prescribed carrier frequency simultaneously of the transmission of said message of any other station in said network.

12. A transceiver according to claim 11, wherein said second means includes means for retransmitting said message a preselected number of times in accordance with the contents of the message received thereby.

13. A transceiver according to claim 12, wherein the message retransmitted by said second means contains information specifying the number of times that the message is to be retransmitted by a station receiving the message.

14. A transceiver according to claim 13, wherein the communication medium over which messages are conveyed among said stations includes an ionospheric channel and said carrier frequency lies in the high frequency portion of the electromagnetic spectrum.

15. A transceiver according to claim 13, wherein a message contains information relating to the quality of the reception of the message and said first means includes means for monitoring said quality-representative information and causing said second means to retransmit said message in response to the monitored quality of the received message being at an acceptable level.

* * * * *